(12) United States Patent
Omuro

(10) Patent No.: US 6,342,980 B1
(45) Date of Patent: Jan. 29, 2002

(54) BEAM SPLITTING PRISM SYSTEM

(75) Inventor: Ryuji Omuro, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/526,462

(22) Filed: Mar. 16, 2000

(30) Foreign Application Priority Data

Mar. 19, 1999 (JP) .......................................... 11-075464

(51) Int. Cl.[7] .......................... G02B 5/04; G02B 27/14; G02B 1/10; H04N 9/07
(52) U.S. Cl. ...................... 359/834; 359/638; 359/583; 348/338
(58) Field of Search ................................. 359/831, 834, 359/837, 638, 640, 583; 348/337, 338, 614; 356/419

(56) References Cited

U.S. PATENT DOCUMENTS

| | | | | |
|---|---|---|---|---|
| 3,932,027 A | * | 1/1976 | Cook et al. | 359/583 |
| 4,035,836 A | * | 7/1977 | Miyaji et al. | 359/634 |
| 4,072,405 A | * | 2/1978 | Ozeki | 359/583 |
| 4,857,997 A | * | 8/1989 | Fukami et al. | 358/55 |
| 5,777,674 A | | 7/1998 | Ohmuro | 348/338 |

FOREIGN PATENT DOCUMENTS

JP 07-281012 10/1995

* cited by examiner

*Primary Examiner*—Cassandra Spyrou
*Assistant Examiner*—Jared Treas
(74) *Attorney, Agent, or Firm*—Fitzpatrick, Cella, Harper & Scinto

(57) ABSTRACT

A beam splitting prism system includes, at least, a first prism for extracting a first light beam along an advancing direction of a light beam coming from an objective lens, an air separation, and a second prism having a predetermined apical angle and having a reflecting surface for extracting a second light beam, wherein the second prism is arranged to cause the second light beam reflected by the reflecting surface to be totally reflected by a surface of the second prism adjacent to the air separation and then exit from the second prism, and the apical angle of the second prism is set such that interference fringes which occur due to reflection of the second light beam by a solid-state image sensor disposed within the optical path of the second light beam do not overlap in a central portion of an image plane of the solid-state image sensor disposed within the optical path of the second light beam.

18 Claims, 7 Drawing Sheets

BEAM SPLITTING PRISM SYSTEM

BACKGROUND OF THE INVENTION

1. Field of the Invention

The present invention relates to a beam splitting prism system for splitting light from an objective lens into a plurality of light beams, and an image pickup apparatus using the beam splitting prism system.

2. Description of Related Art

First, an explanation will be made about a color separation optical system for separating a light beam exiting from an objective lens into a plurality of color components. Here, a color separation prism system for television cameras, which is composed of three prisms for separation into light beams of blue, green and red, is taken as an example. FIG. 6 is a sectional view showing the essential parts of an image pickup apparatus including such a conventional color separation prism system and an objective lens.

Referring to FIG. 6, the image pickup apparatus (television camera) is provided with the prism system 1001 for color-separating light from the interchangeable objective lens Le, and a plurality of solid-state image sensors 1011B, 1011G and 1011R. Light beams obtained by color separation at the prism system 1001 are respectively made to reach the solid-state image sensors 1011B, 1011G and 1011R. The solid-state image sensors 1011B, 1011G and 1011R pick up images formed with the respective color light beams and convert the picked-up images into electrical signals.

In a first prism of the prism system 1001, only blue color light included in light from the objective lens Le, which enters an entrance surface 1002, is reflected by, and the rest of the light is made to pass through, a blue-reflecting dichroic film applied to a surface 1003. The reflected blue color light is totally reflected by the surface 1002 and is then made to exit from a surface 1004, advancing to the solid-state image sensor 1011B for blue color.

A red-reflecting dichroic film applied to a surface 1007 of a second prism reflects only red color light included in light having passed through the surface 1003 and an air separation 1005, and transmits the rest of the green color light. The reflected red color light is totally reflected by an entrance surface 1006 adjacent to the air separation 1005 and is then made to exit from a surface 1008, advancing to the solid-state image sensor 1011R for red color.

The green color light having passed through the surface 1007 is made to exit from a surface 1010, advancing to the solid-state image sensor 1011G for green color. In the manner as described in the foregoing, the color separation prism system separates a light beam.

FIG. 7 is an optical path diagram illustrating a light beam which passes through the first and second prisms of the prism system 1001 from the objective lens Le and then reaches an effective portion of the solid-state image sensor 1011R for red color. A ray of light D included in such a light beam is a peripheral ray of an off-axial light beam passing at the lowest position of an image pickup plane as viewed in FIG. 7. While it is necessary to totally reflect the ray of light D at the second prism, the following condition has to be satisfied so as to reflect the ray of light D at the entrance surface 1006:

$$\theta 2 > (\theta 1 + \delta + \theta max)/2 \quad (1)$$

where

θ1: an apical angle of the first prism,
θ2: an apical angle of the second prism,
$\delta = \sin^{-1}(1/n)$,
n: a refractive index of each of the first prism and the second prism, $\theta max = \sin^{-1}\{1/(2 \cdot n \cdot Fno)\}$, Fno: an F-number of the objective lens.

In Japanese Laid-Open Patent Application No. Hei 7-281012, there is disclosed that, in order to attempt to reduce the size of the color separation prism system, it is necessary to limit the condition (1) to the following range:

$$-0.5° < \theta 2 - \{(\theta 1 + \delta + \theta max)/2\} < 5.5°$$

In the past, while an image pickup tube was used as an image sensor, there was such a problem that the image pickup tube might be stuck, so that it was rare to photograph an intense light source such as the sun directly. Even when such an intense light source was photographed, the photography generally was performed using a light-reducing optical member such as an ND filter.

Meanwhile, in recent years, a solid-state image sensor such as a CCD has been becoming a main trend in place of the image pickup tube, In such a solid-state image sensor, there is no problem with respect to sticking, and smear or blooming is also improved, so that it has become possible to photograph an intense light source such as the sun directly.

However, a new problem has arisen with the use of a CCD. This problem is caused by the construction of the solid-state image sensor or CCD itself. The surface of a CCD is coated with metal, so that a reflection factor thereof is relatively high. Therefore, when an intense light source is directly photographed, strong reflection occurs at the surface of the CCD. Further, since the image pickup surface of the CCD has pixels regularly arranged thereon, diffraction is also caused. This point will be described with reference to FIGS. 8A and 8B.

It is found that such an adverse effect by reflection is caused by a light beam which passes through an optical path within the second prism as shown in FIG. 8A and, then, re-enters the solid-state image sensor 101R, thereby becoming ghost.

FIG. 8B illustrates one ghost optical path, as a diagram obtained by expanding the second prism along the ghost optical path. In particular, a ray of light, which is made incident vertically on the reflecting surface 1007 and is reflected thereby, is illustrated in FIG. 8B. Referring to FIG. 8B, it is apparent that, with regard to a ray of light, among light beams reflected by the CCD, which is made incident on the surface 1006 at an angle α immediately after entering the second prism, such an angle of incidence α and an angle β at which the ray of light is made incident again on the surface 1006 after being reflected by the surface 1007 are equal to each other, being the angle θ2.

In the past, since such a problem as ghost has not occurred due to the problem of the sticking of an image pickup tube, a range of the angle θ2 has been determined only taking into consideration the reduction in size of the color separation prism system. That is, it has been only necessary that the angle θ2 is set to such a small angle as to be enough to make light totally reflected as much as possible. For example, also in Japanese Laid-Open Patent Application No. Hei 7-281012, in order to reduce the size of the color separation prism system by setting the condition of "$-0.5° < \theta 2 - \{(\theta 1 + \delta + \theta max)/2\}$", the apical angle (θ2) of the second prism is set within such a range that light which is not totally-reflected has little influence, without satisfying the condition of total reflection, so that the reduction in size of the color separation prism system is given priority.

Here, supposing the angle θ2 is a little smaller than δ, referring to FIG. 8B, total reflection would not take place at the point p1 and the point P2. Therefore, at the point P1 and the point P2, interference would occur between the two surfaces 1003 and 1006 which are opposed to each other across the air separation 1005.

FIGS. 9A and 9B are diagrams illustrating a ghost optical path in which the angle of light incident on the surface 1007 has slightly shifted from the vertical angle. FIG. 9A shows a ghost optical path of a ray of light which advances slightly upward, and FIG. 9B shows a ghost optical path of a ray of light which advances slightly downward.

At the point P3 and the point P6, since the angle of incidence becomes large, total reflection is more apt to take place, so that there is no problem. However, at the point P4 and the point P5, since, conversely, the angle of incidence becomes small, the condition of total reflection is not satisfied, so that interference fringes are caused there. Ghost accompanied by such interference is not so much conspicuous when the object has low luminance. However, when the object has high luminance, the ghost is observed on the monitor screen picture as shown in FIG. 10. Specifically, interference fringes which are paired at the upper side and the lower side on the image plane (image sensor) occur, and the paired interference fringes overlap each other to be observed, so that the image quality is greatly impaired. Further, the interference of ghost light becomes more conspicuously observed accordingly as the wavelength range of color light causing ghost becomes narrower as in the color separation prism system.

BRIEF SUMMARY OF THE INVENTION

It is an object of the invention to provide, while solving the above-stated problems, a beam splitting prism system capable of obtaining a good picked-up image and an image pickup apparatus having such a beam splitting prism system. Further, it is another object of the invention to provide a beam splitting prism system capable of decreasing interference fringes of light, in particular, ghost accompanied by interference caused by the second prism, and an image pickup apparatus having such a beam splitting prism system.

To attain the above objects, in accordance with an aspect of the invention, there is provided a beam splitting prism system for splitting a light beam coming from an objective lens into a plurality of light beams and for respectively guiding the plurality of light beams to solid-state image sensors respectively disposed within optical paths of the plurality of light beams. The beam splitting prism system includes a first prism for extracting a first light beam along an advancing direction of the light beam coming from the objective lens, an air separation, and a second prism having a predetermined apical angle and having a reflecting surface for extracting a second light beam. The second prism is arranged to cause the second light beam reflected by the reflecting surface to be totally reflected by a surface of the second prism adjacent to the air separation and then exit from the second prism. Also, the apical angle of the second prism is set such that interference fringes which occur due to reflection of the second light beam by the solid-state image sensor disposed within the optical path of the second light beam do not overlap in a central portion of an image plane of the solid-state image sensor disposed within the optical path of the second light beam. Further, in accordance with another aspect of the invention, there is provided an image pickup apparatus having the above-mentioned beam splitting prism system.

In addition, the beam splitting prism system or the image pickup apparatus satisfies the following condition:

$$\delta+\tan^{-1}(h/6L) \leq \theta 2$$

where $\theta 2$ is the apical angle of the second prism, and $\delta = \sin^{-1}(1/n)$, n is a refractive index of the second prism, h is an effective image pickup dimension, in a plane including an entrance optical axis and an exit optical axis of the second prism, of the solid-state image sensor disposed within the optical path of the second light beam, and L is a distance from a central point of an effective image pickup range of the solid-state image sensor disposed within the optical path of the second light beam to the reflecting surface of the second prism when expanding an optical path leading from an entrance surface of the second prism to the solid-state image sensor disposed within the optical path of the second light beam.

Further, the following condition for setting an upper limit is satisfied:

$$\theta 2 \leq \delta + \tan^{-1}(h/3L)$$

In addition, the reflecting surface of the second prism in the beam splitting prism system or the image pickup apparatus has a wavelength splitting property.

Further, the first prism is a prism for extracting a light beam for a blue component, and the second prism is a prism for extracting a light beam for a red component.

The above and further objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
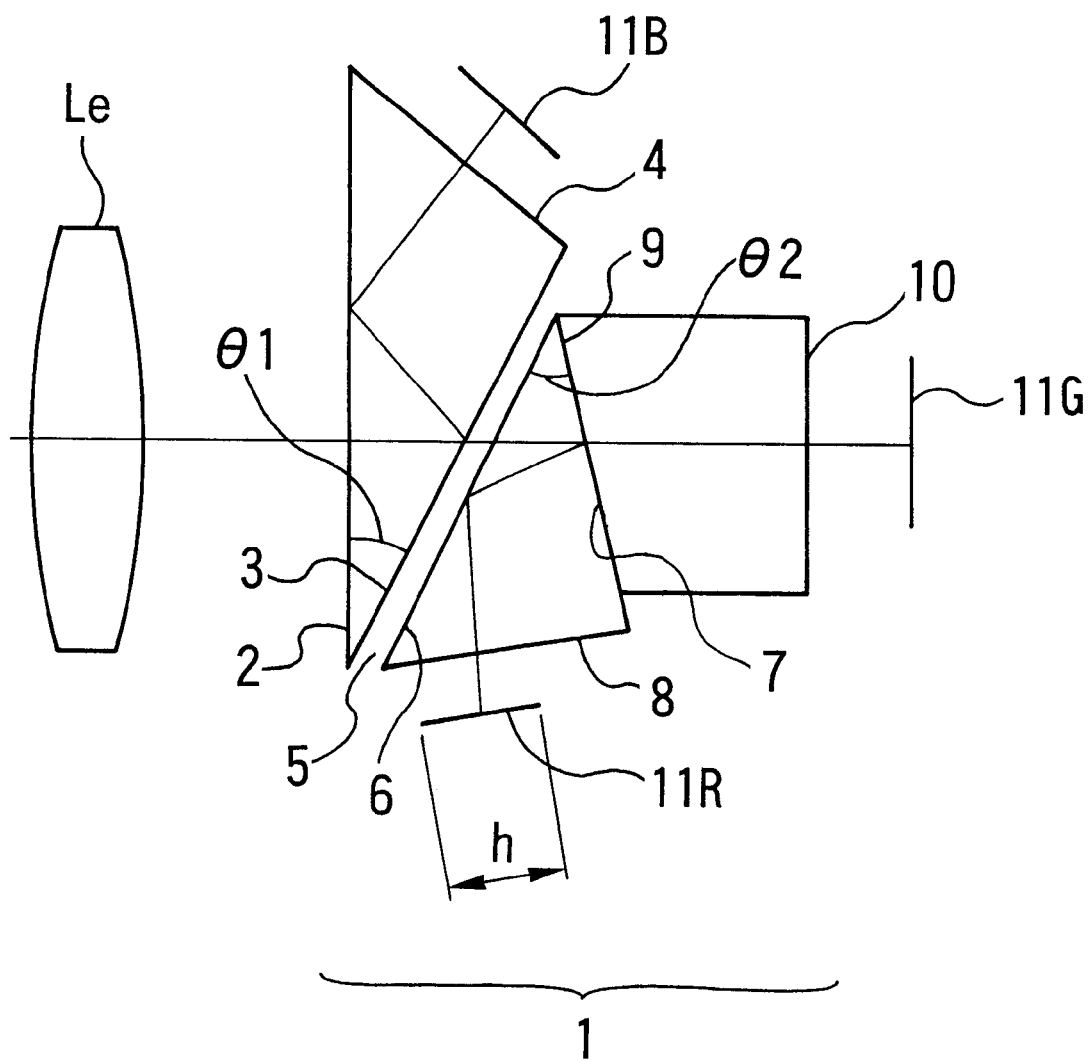
FIG. 1 is a sectional view of a color separation prism system according to an embodiment of the invention.

FIG. 1 is a sectional view of a color separation prism system according to an embodiment of the invention.

Referring to FIG. 1, an objective lens Le, which is removably attached to a camera body (not shown), has the function of forming an object image and projecting the object image onto individual solid-state image sensors 11B, 11G and 11R for blue color, green color and red color.

A color separation prism system 1 is disposed between the objective lens Le and the solid-state image sensors 11B, 11G and 11R, and has the function of separating a light beam coming from the objective lens Le into respective light beams for a blue component, a green component and a red component and guiding the respective light beams to the solid-state image sensors 11B, 11G and 11R. Incidentally, the color separation prism system 1 and the solid-state image sensors 11B, 11G and 11R are fixed in position within the camera body. Further, prisms included in the color separation prism system 1 have one and the same refractive index.

The color separation prism system 1 is composed of three prism blocks, i.e., in order toward the advancing direction of a light beam, a first prism (a prism for extracting a blue component), a second prism (a prism for extracting a red component) disposed adjacent to the first prism across an air separation 5, and a third prism (a prism for extracting a green component) cemented to the second prism. The first prism is provided with, on a surface 3 adjacent to the air separation 5, a blue-reflecting dichroic film (a reflecting surface for blue color) made from a dielectric multilayer film for reflecting only a blue light beam and transmitting remaining light beams. The second prism is provided with, on a surface 7 cemented to the third prism, a red-reflecting dichroic film (a reflecting surface for red color) made from a dielectric multilayer film for reflecting only a red light beam and transmitting a remaining green light beam.

The color separation prism system 1 receives, at an entrance surface 2 of the first prism, a light beam coming from the objective lens Le, and separates the light beam into a reflected light beam for a blue component and the other transmitted light beams at the blue-reflecting dichroic surface 3 of the first prism. The reflected blue light beam is totally reflected by the entrance surface 2 and is then made to exit from a surface 4, being guided to the solid-state image sensor 11B for a blue component.

Among the light beams (a red component and a green component) transmitted by the surface 3, a light beam for a red component is reflected by the red-reflecting dichroic surface 7, while a light beam for a green component is transmitted thereby. The reflected red light beam is totally reflected by an entrance surface 6 (a reflecting surface) of the second prism adjacent to the air separation 5 and is then made to exit from an exit surface 8, being guided to the solid-state image sensor 11R for a red component. The green light beam, which has been transmitted by the two dichroic films, is made to exit from a surface 10, being guided to the solid-state image sensor 11G for a green component.

Figure 2:
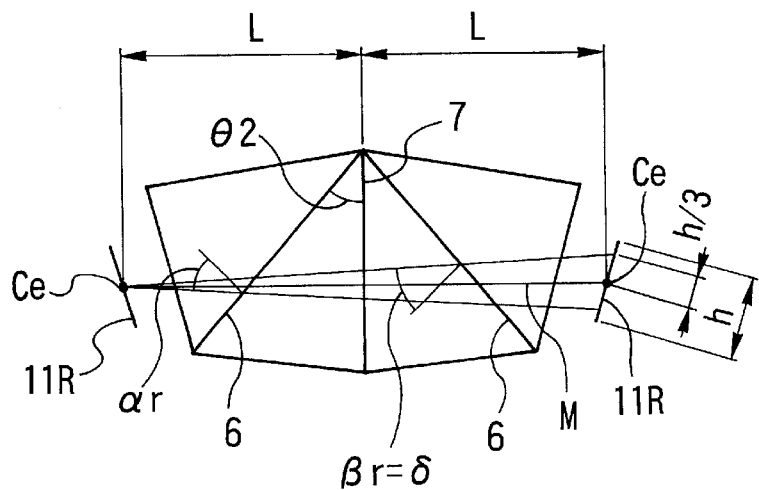
FIG. 2 is an expansion view of an optical path of a second prism of the color separation prism system according to embodiment of the invention, illustrating the manner in which light reflected from a CCD passes within the second prism.

FIG. 2 is an expansion view obtained by expanding an optical path of such ghost light that the red light beam, which has reached once the solid-state image sensor 11R, is reflected by an image pickup surface of the solid-state image sensor 11R to advance backward to the second prism and is then reflected by the red-reflecting dichroic surface 7, being made to enter again the solid-state image sensor 11R. In FIG. 2, $\theta 2$ represents an apical angle of the second prism, which is formed by the reflecting surface 7 and the total-reflecting surface 6.

Further, in FIG. 2, h represents an effective image pickup dimension of the solid-state image sensor 11R as viewed in section, i.e., an effective dimension of the solid-state image sensor 11R in a plane including an entrance optical axis and an exit optical axis of the second prism, and L represents a distance from a central point Ce of an effective portion of the solid-state image sensor 11R to the reflecting surface 7. In the present embodiment shown in FIG. 2, the apical angle $\theta 2$ of the second prism is set to satisfy the following condition:

$$\delta + \tan^{-1}(h/6L) \leq \theta 2$$

where $\delta = \sin^{-1}(1/n)$, and n is a refractive index of the second prism.

The above condition means that, as shown in FIG. 2, a ray of light (ghost light) incident on the reflecting surface 6 at an incident angle $\beta r$ which is equal to $\delta$, included in a light beam reflected by the solid-state image sensor 11R, reaches a position distant by h/3 from the central point Ce of the solid-state image sensor 11R. Then, a ray of light reaching a position distant by less than h/3 from the central point Ce of the solid-state image sensor 11R, relative to the above-mentioned light beam (ghost light), satisfies a condition of "$\beta r > \delta$", and is, therefore, always to be subjected to total reflection, thereby causing no interference fringes due to ghost light.

On the other hand, a ray of light reaching a position distant by more than h/3 from the central point Ce of the solid-state image sensor 11R disadvantageously satisfies a condition of "$\beta r < \delta$", and, therefore, comes to cause interference of light.

Then, if the angle $\beta r$ is replaced with an angle $\alpha r$, the similar phenomenon is caused line-symmetrically with respect a ray of light M incident vertically on the surface 7, thereby causing interference fringes in the similar manner.

Figure 3:
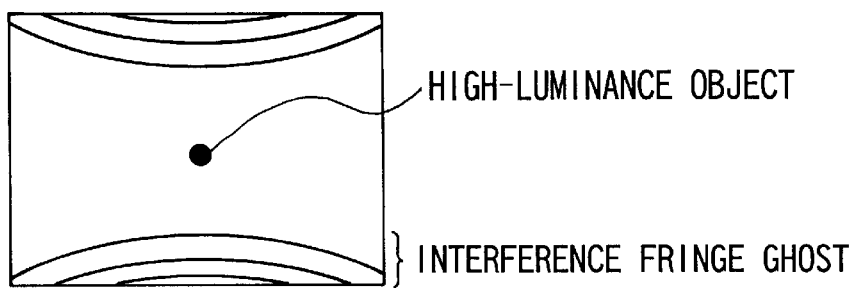
FIG. 3 is a diagram showing the manner of interference fringes occurring on the monitor screen picture by the color separation prism system according to the embodiment of the invention.
Figure 10:
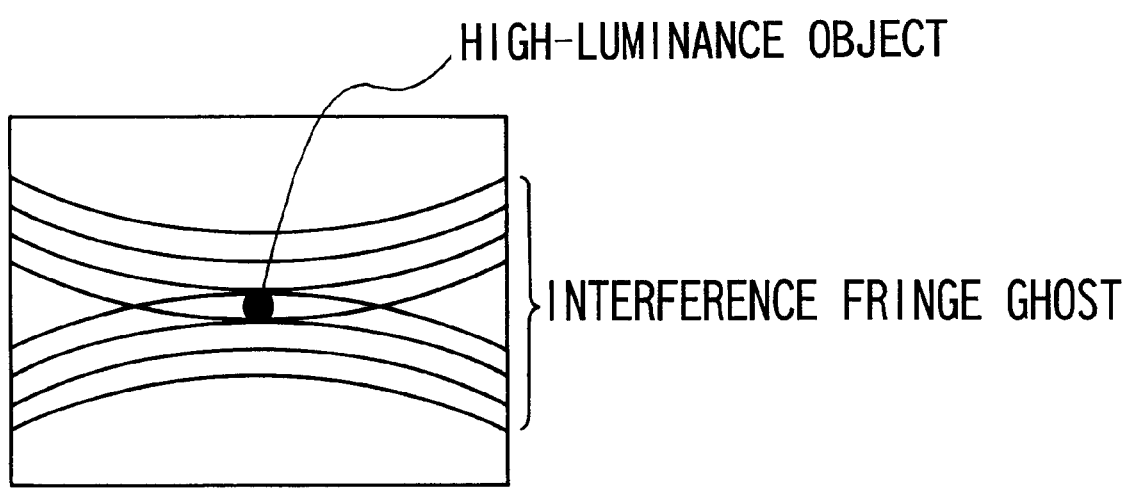
FIG. 10 is a diagram showing the manner of interference fringes caused by the conventional color separation prism system.

FIG. 3 shows the manner of a monitor screen picture obtained when photographing a high-luminance object image by using the color separation prism system according to the embodiment of the invention. It is apparent, as compared with the monitor screen picture shown in FIG. 10, that interference fringes around the high-luminance object image have disappeared, and the monitor screen picture has become clear. Interference fringe ghost is observable only in a range extending from the upper side (or the lower side) as much as ⅙ of the monitor screen picture, so that the lowering of image quality can be suppressed. As mentioned in the foregoing, according to the present embodiment, it becomes possible to considerably improve interference fringes caused by ghost light taking place in a color separation prism system due to reflected light from a solid-state image sensor.

When the apical angle $\theta 2$ of the second prism exceeds the lower limit of the above condition, interference fringes would intrude into a central portion of the image plane, disadvantageously causing the lowering of image quality as in the past. As has been described above, according to the present embodiment, in order to obtain a good quality image, the apical angle of the second prism and the refractive index of the second prism are set such that interference fringes occurring in pair at the upper and lower portions of the image plane do not overlap at the central portion of the image plane. Then, theoretically, if the apical angle $\theta 2$ of the second prism is set to a value not less than the lower limit of the above condition, such a phenomenon that interference fringes would overlap as in the past disappears.

Next, another embodiment of the invention capable of enhancing the effect of the invention will be described with reference to FIG. 4.

Figure 4:
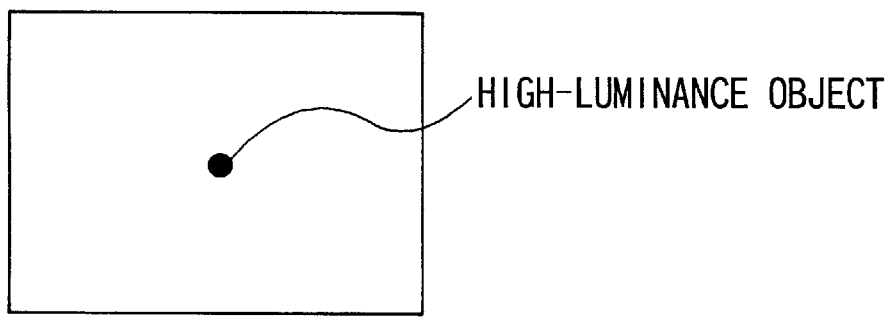
FIG. 4 is a diagram showing the manner of interference fringes occurring on the monitor screen picture by a color separation prism system according to another embodiment of the invention.

In the embodiment shown in FIG. 4, which illustrates the manner of a monitor screen picture, the apical angle θ2 of the second prism is set as "θ2=δ+tan⁻¹(h/4L)".

FIG. 4 shows the manner of the monitor screen picture obtained when a high-luminance object is located at a central portion of the monitor screen picture, as in the above-described embodiment. In the case of the embodiment shown in FIG. 4, it is possible to cause interference fringe ghost to perfectly disappear. The condition in the embodiment shown in FIG. 4 is so set as to shift the position of interference fringe ghost, which would occur in the above-described embodiment, to the outside of the monitor screen picture.

Figure 5:
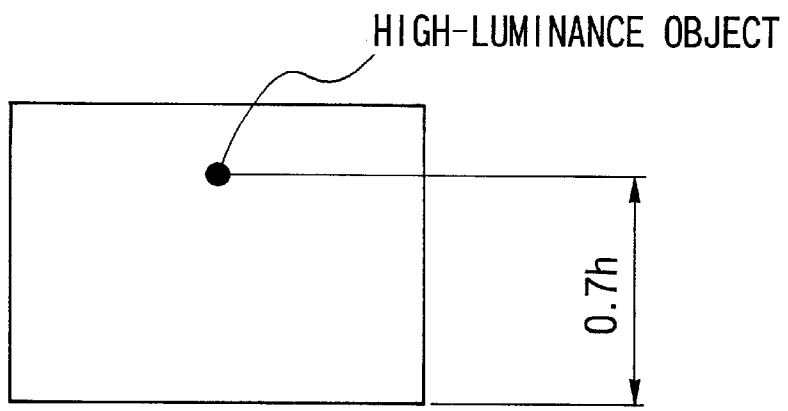
FIG. 5 is a diagram showing the manner of interference fringes occurring on the monitor screen picture by a color separation prism system according to a further embodiment of the invention.
Figure 6:
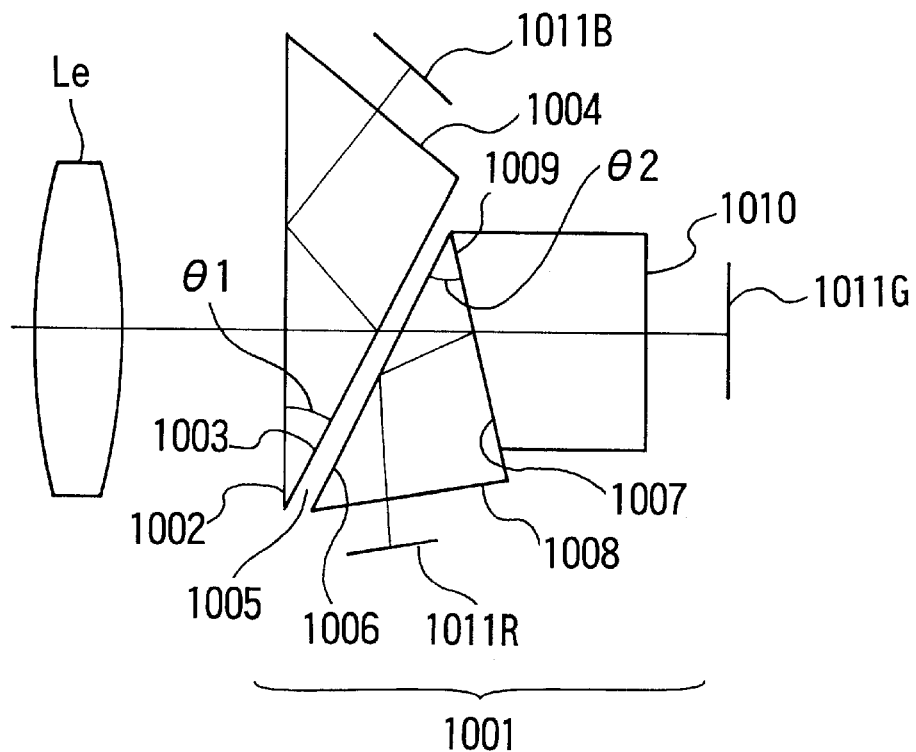
FIG. 6 is an optical sectional view for explaining a conventional color separation prism system.
Figure 7:
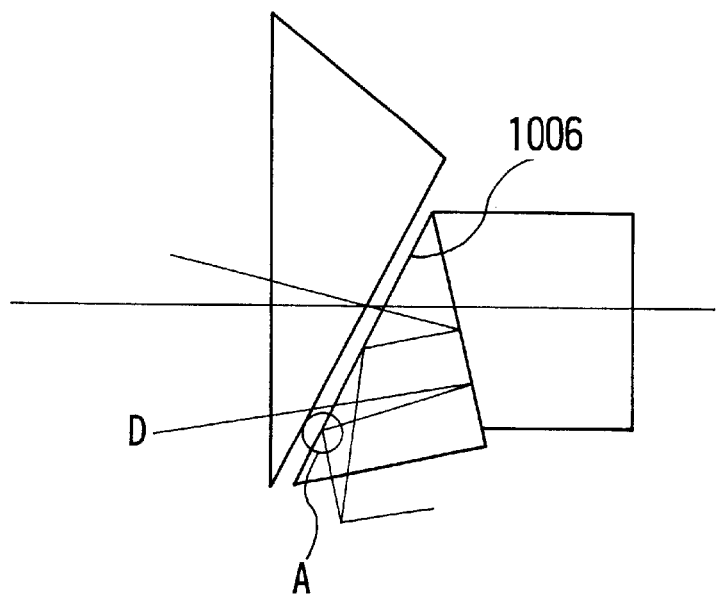
FIG. 7 is an optical sectional view for explaining the conventional color separation prism system.
Figure 8A:
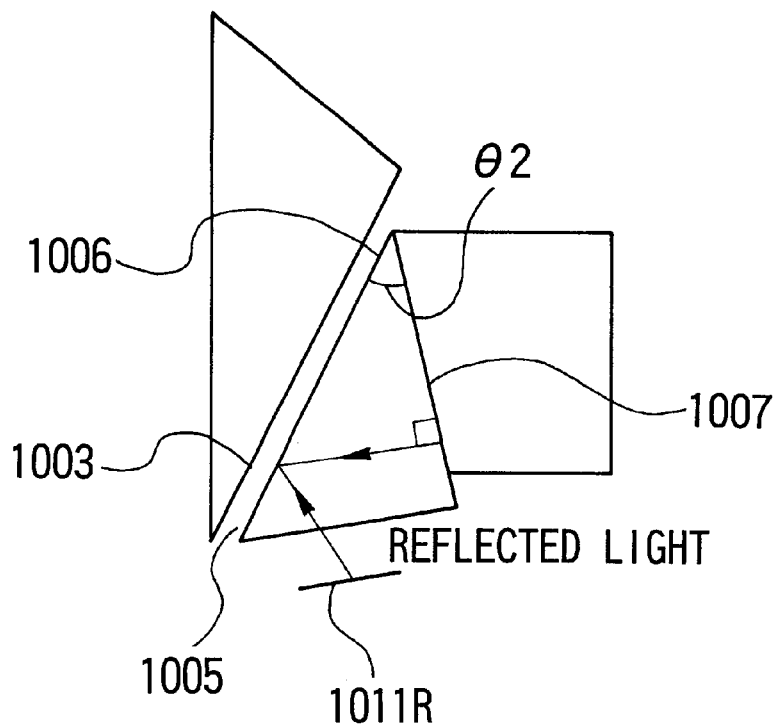
FIGS. 8A and 8B are diagrams showing the manner of reflected light from an image sensor in the conventional color separation prism system.
Figure 8B:
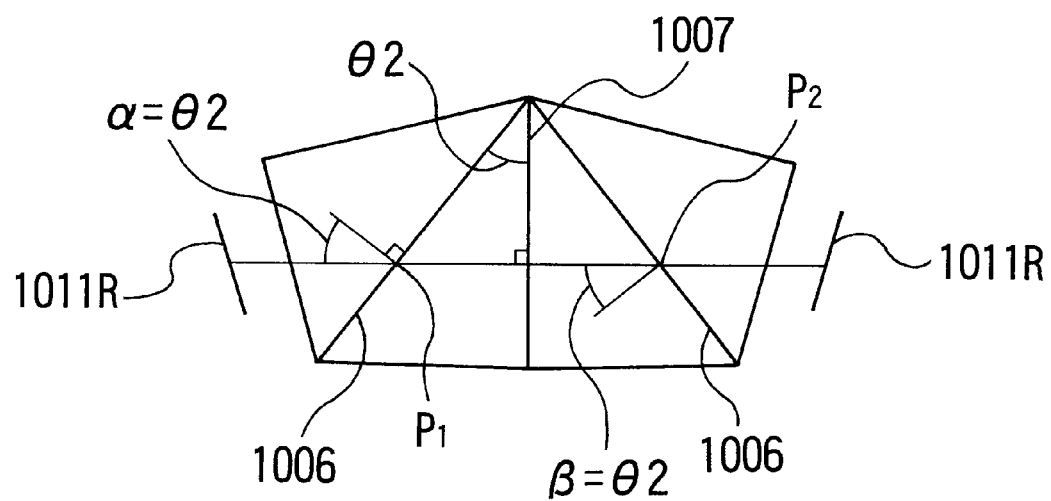
Figure 9A:
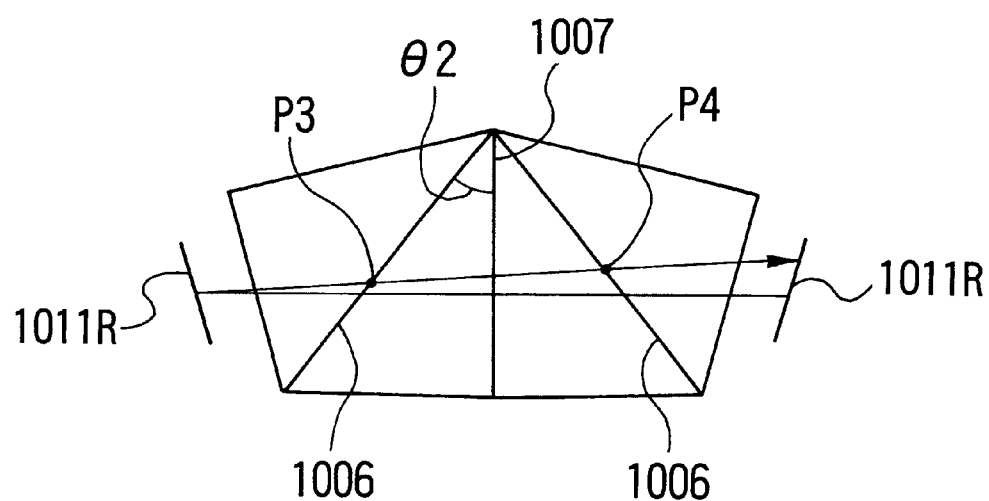
FIGS. 9A and 9B are diagrams showing the manner of reflected light from an image sensor in the conventional color separation prism system.
Figure 9B:
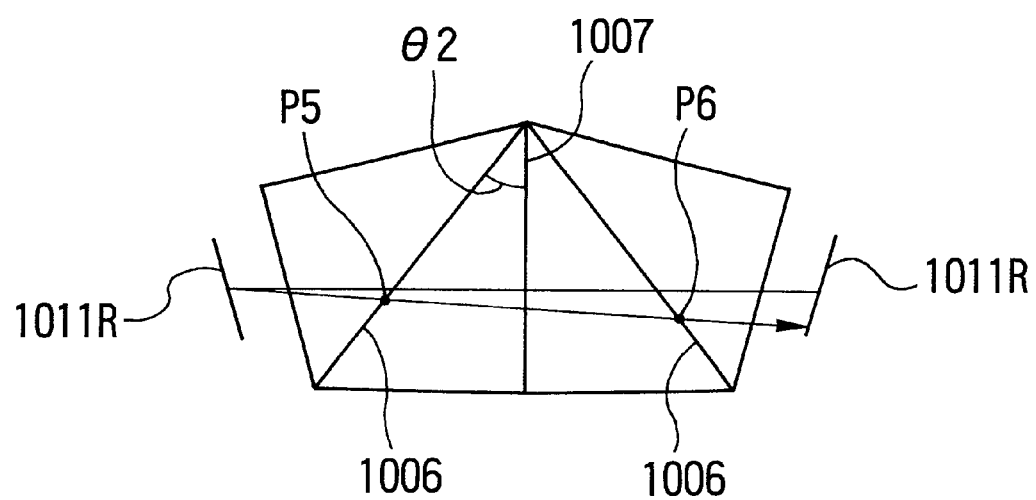

In a case where a high-luminance object is located at a central portion of the monitor screen picture as shown in FIG. 4, interference fringes would not occur on the monitor screen picture, as mentioned in the foregoing. However, in a case where a high-luminance object is located at a marginal portion of the monitor screen picture as shown in FIG. 5, instead of the central portion thereof, interference fringes, which have been located outside the monitor screen picture and have not been observed, gradually become observable. That is, interference fringes depend on not only the apical angle of the second prism but also the position of a high-luminance object.

FIG. 5 shows a further embodiment of the invention, in which interference fringes are made to disappear even if a high-luminance object is located at a marginal portion of the monitor screen picture (the position of 70% in height of the image plane) instead of the central portion thereof.

In the embodiment shown in FIG. 5, the condition for the apical angle θ2 of the second prism is set as follows:

$$\theta 2 \leq \delta + \tan^{-1}(h/3L)$$

By this condition, interference fringe ghost is prevented from occurring, even if a high-luminance object is made to be located at the upper or lower portion (the upper portion in the case of FIG. 5) of the image plane instead of the central portion thereof. Thus, according to the embodiment shown in FIG. 5, interference fringe ghost can be suppressed when a high-luminance object is located at a central portion of the image plane or at a position corresponding to up to 70% of the height of the image plane, so that the lowering of image quality can be remarkably reduced.

Although the larger the apical angle θ2 of the second prism, the greater the effect of preventing the lowering of image quality becomes, if the apical angle θ2 exceeds the upper limit of the above condition, not only the second prism but also a whole camera is caused to disadvantageously increase in size. Therefore, it is the minimum requirement that "δ+tan⁻¹(h/6L)" be set to the lower limit of the apical angle θ2 of the second prism. Further, in order to aim at reducing the size of the second prism, it is necessary to "δ+tan⁻¹(h/3L)" be set to the upper limit of the apical angle θ2 of the second prism. Thus, it is desirable that the apical angle θ2 of the second prism is set within the following range:

$$\delta + \tan^{-1}(h/6L) \leq \theta 2 \leq \theta + \tan^{-1}(h/3L)$$

In the description of the above embodiments, a color separation prism system, in particular, a three-color separation prism system having three prisms, is taken as an example of a prism system. However, the invention aims at decreasing the occurrence of interference fringes of ghost light due to the second prism adjacent to the first prism across the air separation as mentioned in the foregoing, and is, therefore, not limited to the application to the color separation prism system.

For example, it goes without saying that the invention can be applied also to an apparatus in which the first prism is made to be a half-mirror, the reflecting surface of the second prism is made to be an ordinarily-used mirror surface made of aluminum or the like instead of a dichroic mirror, and solid-state image sensors having the respective pixel pitches shifted each other are respectively disposed at positions where light beams exiting from the two prisms are received, so as to obtain a high-definition image. Accordingly, the invention may be applied to beam splitting prism systems, such as a half-mirror, without being limited to a color separation prism system.

As has been described above, according to each of the embodiments disclosed, in a beam splitting prism system composed of, at least, a first prism for extracting a first light beam along an advancing direction of a light beam, an air separation, and a second prism having a predetermined apical angle and arranged for extracting a second light beam by reflection from a reflecting surface for reflecting the second light beam and total reflection at an entrance surface adjacent to the air separation. In addition, an image pickup apparatus in which an image of the light beam exiting from the second prism is converted into an electrical signal by a solid-state image sensor, there is obtained the advantageous effect of effectively suppressing interference fringe ghost which would remarkably lower image quality. In particular, the invention is effective for an image pickup apparatus having a beam splitting prism system in which a reflecting surface of the second prism is an optical thin-film having a wavelength splitting property, as being represented by a color separation prism system.

What is claimed is:

1. A beam splitting prism system for splitting a light beam coming from an objective lens into a plurality of light beams and for respectively guiding the plurality of light beams to solid-state image sensors respectively disposed within optical paths of the plurality of light beams, said beam splitting prism system comprising:

a first prism for extracting a first light beam along an advancing direction of the light beam coming from the objective lens;

an air separation; and a second prism having a predetermined apical angle and having a reflecting surface for extracting a second light beam, wherein said second prism is arranged to cause the second light beam reflected by the reflecting surface to be totally reflected by a surface of said second prism adjacent to said air separation and then exit from said second prism, and the apical angle of said second prism is set such that interference fringes which occur due to reflection of the second light beam by the solid-state image sensor disposed within the optical path of the second light beam do not overlap in a central portion of an image plane of the solid-state image sensor disposed within the optical path of the second light beam.

2. A beam splitting prism system according to claim 1, wherein the following condition is satisfied:

$$\delta+\tan^{-1}(h/6L) \leq \theta 2$$

where $\theta 2$ is the apical angle of said second prism, and
$\delta = \sin^{-1}(1/n)$,
n is a refractive index of said second prism,
h is an effective image pickup dimension, in a plane including an entrance optical axis and an exit optical axis of said second prism, of the solid-state image sensor disposed within the optical path of the second light beam, and
L is a distance from a central point of an effective image pickup range of the solid-state image sensor disposed within the optical path of the second light beam to the reflecting surface of said second prism when expanding an optical path leading from an entrance surface of said second prism to the solid-state image sensor disposed within the optical path of the second light beam.

3. A beam splitting prism system according to claim 2, wherein the following condition is further satisfied:

$$\theta 2 \leq \delta + \tan^{-1}(h/3L).$$

4. A beam splitting prism system according to claim 1, wherein the reflecting surface of said second prism has a wavelength splitting property.

5. A beam splitting prism system according to claim 1, wherein said first prism is a prism for extracting a light beam for blue component, and said second prism is a prism for extracting a light beam for red component.

6. An image pickup apparatus comprising:

a beam splitting prism system for splitting a light beam coming from an objective lens into a plurality of light beams; and solid-state image sensors respectively disposed within optical paths of the plurality of light beams obtained by said beam splitting prism system, said beam splitting prism system including:
a first prism for extracting a first light beam along an advancing direction of the light beam coming from the objective lens;
an air separation; and
a second prism having a predetermined apical angle and having a reflecting surface for extracting a second light beam, wherein said second prism is arranged to cause the second light beam reflected by the reflecting surface to be totally reflected by a surface of said second prism adjacent to said air separation and then exit from said second prism, and the apical angle of said second prism is set such that interference fringes which occur due to reflection of the second light beam by the solid-state image sensor disposed within the optical path of the second light beam do not overlap in a central portion of an image plane of the solid-state image sensor disposed within the optical path of the second light beam.

7. An image pickup apparatus according to claim 6, wherein the following condition is satisfied:

$$\delta+\tan^{-1}(h/6L) \leq \theta 2$$

where $\theta 2$ is the apical angle of said second prism, and
$\delta = \sin^{-1}(1/n)$,
n is a refractive index of said second prism,
h is an effective image pickup dimension, in a plane including an entrance optical axis and an exit optical axis of said second prism, of the solid-state image sensor disposed within the optical path of the second light beam, and
L is a distance from a central point of an effective image pickup range of the solid-state image sensor disposed within the optical path of the second light beam to the reflecting surface of said second prism when expanding an optical path leading from an entrance surface of said second prism to the solid-state image sensor disposed within the optical path of the second light beam.

8. An image pickup apparatus according to claim 7, wherein the following condition is further satisfied:

$$\theta 2 \leq \delta + \tan^{-1}(h/3L).$$

9. An image pickup apparatus according to claim 6, wherein the reflecting surface of said second prism has a wavelength splitting property.

10. An image pickup apparatus according to claim 6, wherein said first prism is a prism for extracting a light beam for a blue component, and said second prism is a prism for extracting a light beam for a red component.

11. A beam splitting prism system for splitting a light beam coming from an objective lens into a plurality of light beams and for respectively guiding the plurality of light beams to solid-state image sensors respectively disposed within optical paths of the plurality of light beams, said beam splitting prism system comprising:

a first prism for extracting a first light beam along an advancing direction of the light beam coming from the objective lens;

an air separation; and a second prism having a predetermined apical angle and having a reflecting surface for extracting a second light beam, wherein said second prism is arranged to cause the second light beam reflected by the reflecting surface to be totally reflected by a surface of said second prism adjacent to said air separation and then exit from said second prism, and the following condition is satisfied:

$$\delta+\tan^{-1}(h/6L) \leq \theta 2$$

where $\theta 2$ is the apical angle of said second prism, and
$\delta = \sin^{-1}(1/n)$,
n is a refractive index of said second prism,
h is an effective image pickup dimension, in a plane including an entrance optical axis and an exit optical axis of said second prism, of the solid-state image sensor disposed within the optical path of the second light beam, and
L is a distance from a central point of an effective image pickup range of the solid-state image sensor disposed within the optical path of the second light beam to the reflecting surface of said second prism when expanding an optical path leading from an entrance surface of said second prism to the solid-state image sensor disposed within the optical path of the second light beam.

12. A beam splitting prism system according to claim 11, wherein the following condition is further satisfied:

$$\theta 2 \leq \delta + \tan^{-1}(h/3L).$$

13. A beam splitting prism system according to claim 11, wherein the reflecting surface of said second prism has a wavelength splitting property.

14. A beam splitting prism system according to claim 11, wherein said first prism is a prism for extracting a light beam for a blue component, and said second prism, is prism for extracting a light beam for a red component.

15. An image pickup apparatus comprising:
   a beam splitting prism system for splitting a light beam coming from an objective lens into a plurality of light beams; and
   solid-state image sensors respectively disposed within optical paths of the plurality of light beams obtained by said beam splitting prism system,
   said beam splitting prism system including:
      a first prism for extracting a first light beam along an advancing direction of the light beam coming from the objective lens;
      an air separation; and
      a second prism having a predetermined apical angle and having a reflecting surface for extracting a second light beam,
   wherein said second prism is arranged to cause the second light beam reflected by the reflecting surface to be totally reflected by a surface of said second prism adjacent to said air separation and then exit from said second prism, and the following condition is satisfied:

$$\delta + \tan^{-1}(h/6L) \leq \theta 2$$

where
   $\theta 2$ is the apical angle of said second prism, and
   $\delta = \sin^{-1}(1/n)$,
   n is a refractive index of said second prism,
   h is an effective image pickup dimension, in a plane including an entrance optical axis and an exit optical axis of said second prism, of the solid-state image sensor disposed within the optical path of the second light beam, and
   L is a distance from a central point of an effective image pickup range of the solid-state image sensor disposed within the optical path of the second light beam to the reflecting surface of said second prism when expanding an optical path leading from an entrance surface of said second prism to the solid-state image sensor disposed within the optical path of the second light beam.

16. An image pickup apparatus according to claim 15, wherein the following condition is further satisfied:

$$\theta 2 \leq \delta + \tan^{-1}(h/3L).$$

17. An image pickup apparatus according to claim 15, wherein the reflecting surface of said second prism has a wavelength splitting property.

18. An image pickup apparatus according to claim 15, wherein said first prism is a prism for extracting a light beam for a blue component, and said second prism is a prism for extracting a light beam for a red component.

* * * * *

UNITED STATES PATENT AND TRADEMARK OFFICE
CERTIFICATE OF CORRECTION

PATENT NO. : 6,342,980 B1
DATED : January 29, 2002
INVENTOR(S) : Omura

It is certified that error appears in the above-identified patent and that said Letters Patent is hereby corrected as shown below:

Column 2,
Line 19, "tube," should read -- tube. --; and
Line 36, "101R," should read -- 1011R, --.

Column 4,
Line 38, "to" should read -- to the --.

Column 6,
Line 39, "respect" should read -- respect to --.

Column 7,
Line 65, "$\leq \theta2 \leq \theta + \tan^{-1}(h/3L)$" should read -- "$\leq \theta2 \leq \delta + \tan^{-1}(h/3L)$ --.

Column 12,
Line 10, "en trance" should read -- entrance --.

Signed and Sealed this

Thirty-first Day of December, 2002

JAMES E. ROGAN
*Director of the United States Patent and Trademark Office*